United States Patent [19]

Jones

[11] Patent Number: 4,716,782
[45] Date of Patent: Jan. 5, 1988

[54] PULL LOOP SAFETY HANDLE FOR MOTORCYCLES

[76] Inventor: J. D. Jones, 1211 Kwis Ave., Hacienda Heights, Calif. 91745

[21] Appl. No.: 879,349

[22] Filed: Jun. 27, 1986

[51] Int. Cl.⁴ .......................... F16C 1/10; B62K 23/06
[52] U.S. Cl. .................................... 74/501 R; 74/551.8
[58] Field of Search ................... 74/543, 551.8, 551.9, 74/500.5, 501.6, 502.2, 489, 488, 523; 2/17; 16/110 R; 280/289 G, 289 H

[56] References Cited

U.S. PATENT DOCUMENTS

| | | | |
|---|---|---|---|
| 706,346 | 8/1902 | Schmidt | 2/17 |
| 1,122,971 | 12/1914 | Mayer | 74/551.8 X |
| 1,297,661 | 3/1919 | Cooper | 2/17 X |
| 1,349,889 | 8/1920 | Koch | 2/17 X |
| 1,747,097 | 2/1930 | Young | 2/17 |
| 2,337,767 | 12/1943 | Paul | 2/17 |
| 2,755,477 | 7/1956 | Hubbman | 2/17 |
| 3,720,111 | 3/1973 | Guyton | 74/489 |
| 3,803,937 | 4/1974 | Johnston | 74/489 |
| 3,832,912 | 9/1974 | Edwards | 74/551.8 |
| 3,937,629 | 2/1976 | Hamasaka | 74/551.8 |

Primary Examiner—Gary L. Smith
Assistant Examiner—Rodney M. Lindsey
Attorney, Agent, or Firm—Edgar W. Averill, Jr.

[57] ABSTRACT

An improved pull loop safety handle for motorcycles. The handle is of the type which includes a pivot point connectable to the handle bars of a motorcycle, bicycle scooter, all terrain vehicle or quad. A cable connection fitting is positioned on the handle and the improvement includes a continuation of the arm into a closed loop having an inner opening sufficiently large for the user's fingers to extend therein.

4 Claims, 7 Drawing Figures

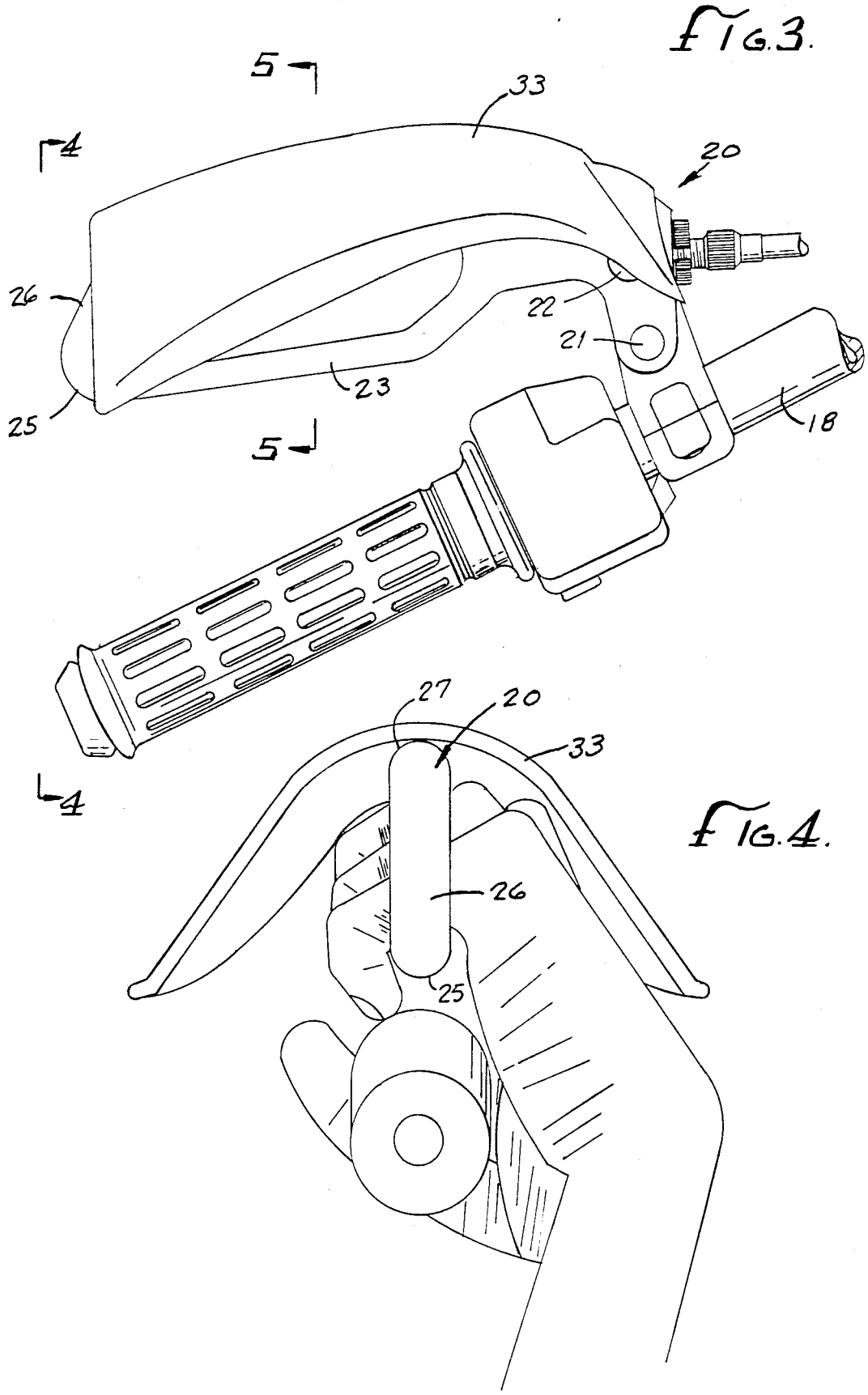

PULL LOOP SAFETY HANDLE FOR MOTORCYCLES

BACKGROUND OF THE INVENTION

The field of the invention is motorcycles and the invention relates more particularly to handles for operating the brake and clutch of motorcycles or other motor-operated machines. The original handles for operating the front brake or clutch of a motorcycle comprised an extended arm which ended in a point. These handles are mounted to the handle bars of the motorcycle and are positioned in front of the hand grips at the end of the handle bars. The user's fingers and knuckles extend over the levers and they are operated by squeezing them closer to the hand grips which, in turn, pulls the cable affixed to the handle or lever.

Because of injuries occurring when the pointed end struck the rider during a fall, an enlarged knob has been added and the vast majority of handles now include this safety feature. Unfortunately, the knob, itself, can provide a safety hazard if it happens to strike the user in a vulnerable spot and, also, the knob occasionally breaks off after a fall and the sharpened end provides a substantial safety hazard.

SUMMARY OF THE INVENTION

It is an object of the present invention to provide a safer handle for operating the brakes and clutch of a motorcycle or other motor-operated machine.

Another object of the present invention is to provide a handle which has a mounting surface for a gravel shield.

The present invention is for an improved pull loop safety handle for motorcycles and the like of the type including a pivot point connectable to the handle bars of a motorcycle and a cable connection fitting positioned on the handle near the pivot point. Such handles include an elongated arm extending away from the pivot point and the improvement of the present invention comprises a continuation of the arm into a closed loop having an inner opening sufficiently large for the user's fingers to extend therein. The closed loop has a front arm extending from the elongated arm and continuing to a point of connection with the body of the handle. Shield means may be affixed over the front arm and, preferably, are attached to the front arm to provide a shield against gravel or other objects which might otherwise strike the user's fingers.

BRIEF DESCRIPTION OF THE DRAWINGS

FIG. 3 is a top view of the pull loop safety handle of the present invention including a shield affixed thereto.

FIG. 4 is an end view taken along line 4—4 of FIG. 3.

DESCRIPTION OF THE PREFERRED EMBODIMENTS

Figure 1:
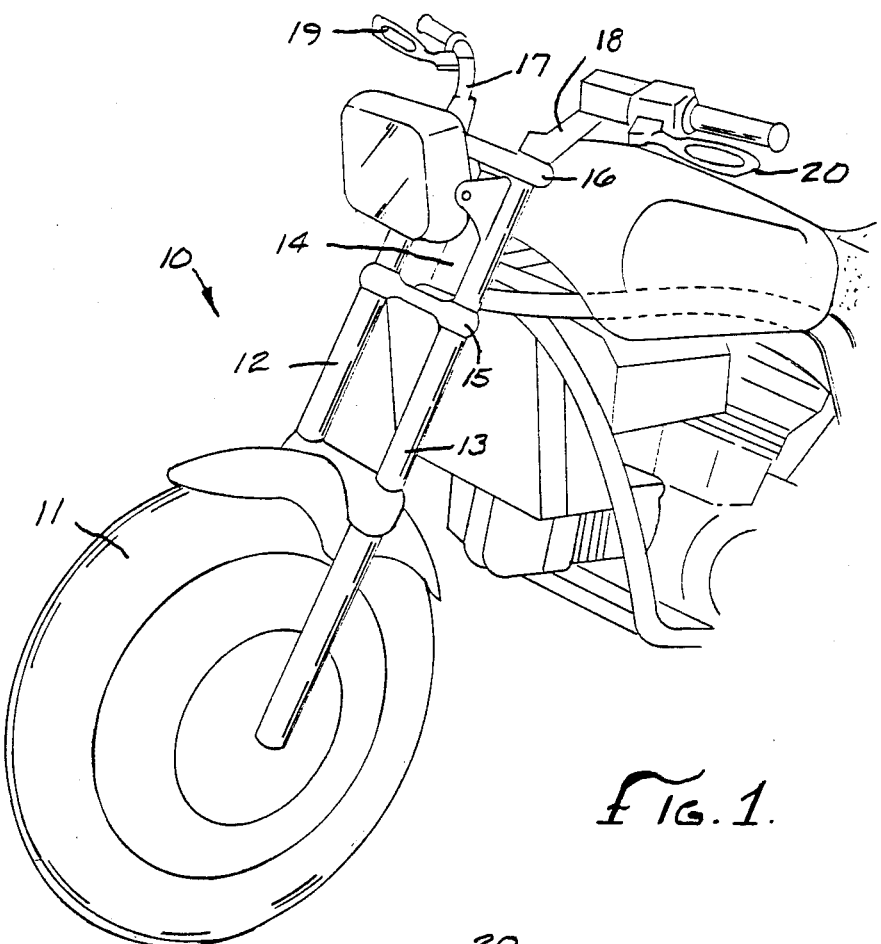
FIG. 1 is a perspective view showing the front half of a motorcycle including the improved pull loop safety handle of the present invention.

A motorcycle is shown in FIG. 1 and indicated generally by reference character 10. Motorcycle 10 has a front wheel 11 attached to the motorcycle through a pair of front forks 12 and 13 which, in turn, are affixed to the frame 14 by a pair of triple clamps 15 and 16. A pair of handle bars 17 and 18 are attached to triple clamp 16 and include two of the pull loop safety handles of the present invention. The right-hand handle which operates the front brake is indicated by reference character 19 and the left-hand handle which operates the clutch is indicated by reference character 20.

Figure 2:
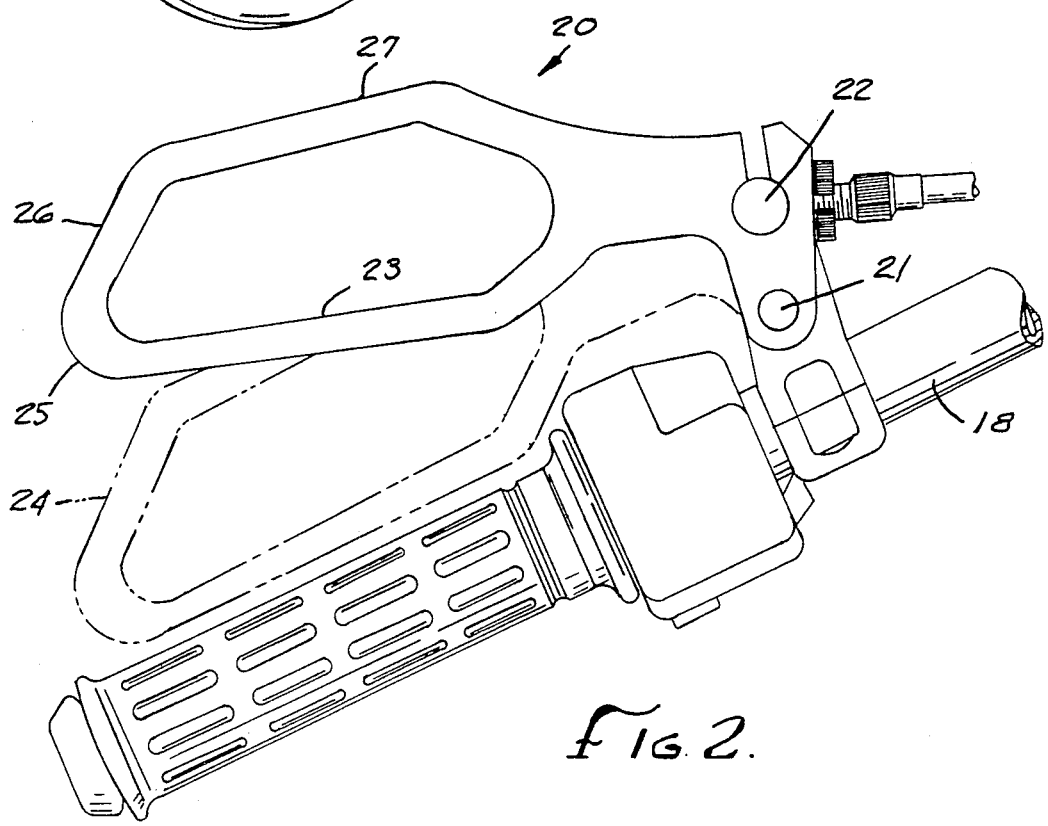
FIG. 2 is an enlarged top view of the improved pull loop safety handle of the present invention attached to a motorcycle handle bar.

An enlarged top view of the clutch handle 20 is shown in FIG. 2. Handle 20 is connected to the handle bars through a pivot point 21. Near pivot point 21 is a cable connection fitting 22 which, like pivot point 21, is of conventional design. Handle 20 has an elongated arm portion 23 which is contacted by the user's fingers as indicated generally by FIG. 4 of the drawings. The handle 20 moves inwardly as shown by the phantom line 24 of FIG. 2. Elongated arm 23 curves at 25 and has an outer portion 26 and a front arm 27.

Figure 7:
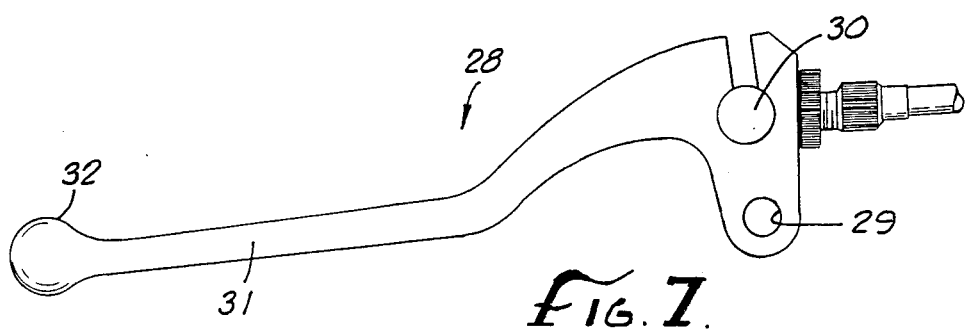
FIG. 7 is a top view of a prior art handle.

This construction where there is no blunt end provides a substantially safer handle than the prior art handle shown in FIG. 7. The handle in FIG. 7 is indicated generally by reference character 28 and, like handle 20, has a pivot point 29 and a cable connection fitting 30. It also has an elongated arm 31 similar to that of handle 20 but, unlike handle 20, it terminates in a knob 32 which, although better than the earlier sharp point, still provides a potential safety hazard. Handle 20 has a smooth exterior periphery which provides the maximum in safety with no disadvantage in operator use.

Figure 5:
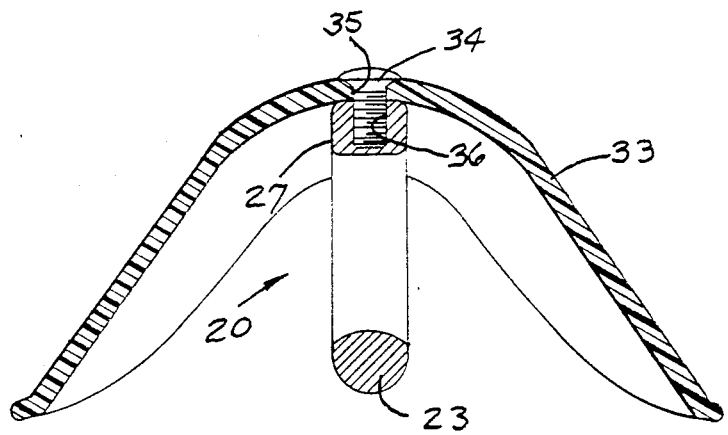
FIG. 5 is a cross-sectional view taken along line 5—5 of FIG. 3.

A further improvement may be easily added to handle 20 as indicated in FIGS. 3 through 6. A shield 33 is fabricated from an impact-resistant plastic such as acrylo-nitrile butadiene styrene terpolymer. Shield 33 may be affixed to handle 20 or, for that matter, to handle bar 18 in many ways. One such way is indicated in FIG. 5 where a screw 34 passes through a hole 35 and shield 33 into a threaded opening 36 in front arm 27.

Figure 6:
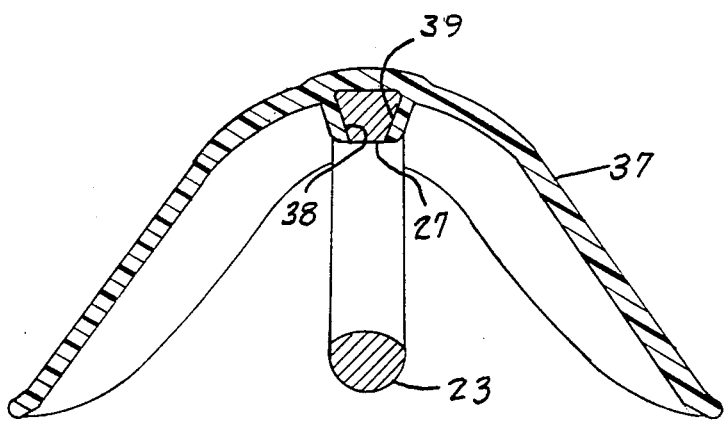
FIG. 6 is a cross-sectional view analogous to FIG. 5 showing an alternate attachment method of a shield to the pull loop safety handle of the present invention.

Another type of attachment is indicated in FIG. 6 where shield 37 has a groove 38 which fits over an extension 39 in front arm 27.

As shown best in FIG. 4, the shield 33 curves back over the rider's hand and any objects such as gravel, branches or the like are deflected by the shield adding to the safety and comfort of the rider. Furthermore, in cold weather, a shield acts as a windshield.

Although the improved pull loop safety handle of the present invention has been shown as a generally trapezoidal-shaped handle, it could, instead, have an entirely rounded front arm and outer portion. The important element is that the handle has no blunt end which can provide a safety hazard. With the ever more powerful motorcycles and ever more challenging race courses, further safety improvements must be developed to improve the safety of motorcycles. Of course, the invention is not limited to use on motorcycles, and other vehicles or machines which are subjected to the same potential safety hazards could also benefit from the use of the safety handle of the present invention.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A pull loop safety handle and a handlebar for handlebar controlled vehicles, said pull loop safety handle being of the type including a body having a pivot point pivotably connected to the handlebar of the handlebar controlled vehicle, a cable connection fitting positioned on said body handle near its pivot point and an elongated arm extending from the pivot point wherein the improvement comprises:

a continuation of the arm by means of an integral front arm into a closed loop having an inner opening sufficiently large for the user's fingers to extend therein and including the elongated arm for operating said pool loop safety handle and the integral front arm extending from said elongated arm and continuing to a point of connection with the body of said pool loop safety handle; and shield means affixed to the front arm of said handle.

2. The pull loop safety handle of claim 1 wherein said closed loop has a rounded exterior periphery.

3. The pull loop safety handle of claim 1 wherein said shield is affixed to said front arm by at least one screw extending through said shield into said front arm.

4. The pull loop safety handle of claim 1 wherein said shield has a groove and said front arm has a matching extension whereby said shield can be slid into attachment with the front arm.

* * * * *